United States Patent Office 3,000,986
Patented Sept. 19, 1961

3,000,986
ALKYLATION OF AROMATIC COMPOUNDS
George Andrew Olah and Steven Joseph Kuhn, Sarnia, Ontario, Canada, assignors to The Dow Chemical Company, Midland, Mich., a corporation of Delaware
No Drawing. Filed Dec. 16, 1957, Ser. No. 702,754
5 Claims. (Cl. 260—671)

This invention relates to improvements in the alkylation of aromatic compounds and particularly pertains to such alkylation reactions wherein the alkylating agent comprises an alkyl fluoride and boron trifluoride.

An object of this invention is to provide improved means for preparation of alkyl-substituted aromatic compounds.

Another object of this invention is to provide improved means for alkylation of aromatic compounds.

It is among the specific objects of this invention to provide such means for alkylation of aromatic compounds with alkyl fluorides.

Other objects and advantages of the invention will be apparent in the following description.

The objects of this invention have been attained in a method of preparation of alkyl-substituted aromatic compounds by alkylation of aromatic compounds with alkylating agents that comprises alkyl fluorides and boron trifluoride.

In one embodiment, the invention contemplates reacting an aromatic compound, an alkyl fluoride, and boron trifluoride and decomposing the resulting complex to liberate the alkylated aromatic compound product.

In another embodiment, the invention contemplates reacting an aromatic compound with a preformed alkyl fluoroborate, i.e. a preformed reaction product of an alkyl fluoride and boron trifluoride, and decomposing the resulting reaction complex to liberate the alkylated aromatic compound product.

The aromatic compounds that can be alkylated in accordance with this method are ones which are per se substantially inert to boron trifluoride at the temperatures of the reaction and which contain at least one replaceable hydrogen atom on an aromatic nucleus. Suitable aromatic compounds can be mononuclear compounds such as benzene compounds, or can be polynuclear or fused ring compounds such as biphenyl, naphthalene, or anthracene compounds. These compounds can be hydrocarbons, including alkyl-substituted and cycloalkyl-substituted aromatic hydrocarbons, and those having chlorine, bromine, or iodine substituents. Such aromatic compounds can be represented by the formula $$Ar-H$$

wherein the symbol Ar— represents an aromatic radical such as an aromatic hydrocarbon radical, or the same substituted by alkyl or cycloalkyl groups, and chloro-, bromo-, or iodo-derivatives thereof, and the symbol —H represents a replaceable hydrogen atom on the nucleus of such aromatic radical.

Specific examples of suitable starting aromatic compounds that can be alkylated in accordance with the present method are benzene, toluene, the xylenes, ethylbenzene, the ethyltoluenes, isopropylbenzene, mesitylene, cyclohexylbenzene, chlorobenzene, dichlorobenzene, ar-chlorotoluene, biphenyl, and naphthalene.

The alkyl fluorides, i.e., fluoroalkanes, for use in this invention are representable by the formula $$C_nH_{2n+1}F$$

wherein the symbol $n$ represents an integer at least one, e.g. from one to sixteen, and preferably from one to four. Specific examples of such alkyl fluorides are methyl fluoride, ethyl fluoride, n-propyl fluoride, isopropyl fluoride, isobutyl fluoride, tert-butyl fluoride, hexyl fluoride, octyl fluoride, and hexadecyl fluoride.

In one embodiment of the invention, boron trifluoride is passed into a liquid mixture of an aromatic compound and an alkyl fluoride of the kinds hereinbefore described. When it is intended to make a mono-alkyl-substituted product, the alkyl fluoride is usually employed in an amount corresponding to not more than one mole thereof, preferably from 0.1 to 1 mole, per mole of the starting aromatic compound. When the starting aromatic compound has only one replaceable hydrogen atom, or when it is desired to make a poly-alkylated product from a starting aromatic compound that has more than one replaceable hydrogen atom, then the alkyl fluoride can be used in larger proportion, e.g. more than one mole thereof per mole of the starting aromatic compound.

Preferably, the boron trifluoride is passed into the reaction mixture until the same is saturated, the amount required being approximately one mole thereof per mole of the alkyl fluoride in the starting mixture. During the addition of the boron trifluoride, the temperature of the reaction mixture is maintained below 50° C., preferably below 0° C., e.g. between −100° C. and 0° C., while yet maintaining a liquid reaction mixture and employing pressure if necessary at the higher temperatures.

During the addition of the boron trifluoride, a rapid reaction takes place usually with separation of a complex reaction product when the reaction is carried out below about 0° C. Upon heating, this complex decomposes with evolution of boron trifluoride, usually at temperatures below 0° C.; the reaction mixture is conveniently allowed to come to room temperature and can be heated to 50° C. or more to complete the reaction. From the resulting organic reaction mixture, there can be recovered the alkylated aromatic compound product as set forth below.

In another embodiment of the invention, an intermediate alkyl fluoroborate complex is first formed by interacting boron trifluoride and the starting alkyl fluoride, usually in approximately equimolar quantities, at temperatures below 0° C., preferably between −200° and 0° C., and then adding thereto the starting aromatic compound. During the addition of the starting aromatic compound, the temperature of the reaction mixture is preferably maintained below 0° C., e.g. between −100° C. and 0° C., while yet maintaining a liquid reaction mixture as described above. The resulting reaction mixture, containing a complex reaction product, can then be warmed, whereupon the complex decomposes with evolution of boron trifluoride, usually at temperatures below 0° C., forming an organic reaction mixture that contains the alkylated aromatic compound product.

The organic reaction mixture, resulting from either of the embodiments described above or their equivalents, can be treated in usual ways to recover the alkylated aromatic compound product therefrom.

For instance, the organic reaction product can be washed with water to remove water-soluble acids, dried, and fractionally distilled to obtain a fraction comprising the alkylated aromatic compound product.

When the preparation of alkyl-substituted aromatic compounds is carried out in accordance with the herein-described method of this invention, it has now been found that the yield of the alkylated product based on the reacted starting materials is very good, that the alkyl aromatic product can be readily recovered from the reaction mixture in a form of good quality, and that only negligible amounts of tars, polymers, and other undesired by-products are formed. In these and other respects, this method is advantageous over other known means of alkylation of aromatic compounds.

Furthermore, the method of the invention can be carried out with starting materials that contain halogen atoms other than fluorine, i.e. chlorine, bromine, or iodine atoms, or impurities comprising such other atoms, without such other halogen atoms participating in this reaction. In other words, the alkylation method described is peculiar and selective to alkyl fluorides.

The following examples illustrate the invention, but are not to be construed as restricting its scope.

Example 1.—Methylation of toluene

To two moles of toluene at the temperature of solid carbon dioxide was added 0.5 mole of methyl fluoride. The resulting mixture was saturated with boron trifluoride, 0.5 mole of the latter being used. A colored, oily complex layer formed but was not withdrawn. The resulting mixture was allowed to warm to room temperature, there being a copious evolution of boron trifluoride. The resulting organic liquid layer was washed with water until free of acid, dried, and fractionally distilled. After removal of unreacted toluene, there was obtained a fraction of mixed xylenes in amount corresponding to approximately 62 percent of theory based on the methyl fluoride taken.

Example 2.—Ethylation of toluene

By procedural steps similar to those described in Example 1 and using ethyl fluoride in place of methyl fluoride, there was obtained as product a mixture of ethyl toluenes in amount corresponding to approximately 81 percent based on the ethyl fluoride taken.

Example 3.—Ethylation of m-xylene

To one mole of m-xylene at a temperature of $-45°$ C. was added 0.5 mole of ethyl fluoride. The resulting mixture was saturated with boron trifluoride, 0.5 mole of the latter being used. A colored, oily complex layer formed but was not withdrawn. The resulting mixture was allowed to warm to room temperature, there being a copious evolution of boron trifluoride. The resulting organic liquid layer was washed with water until free of acid, dried, and fractionally distilled. After removal of unreacted m-xylene, there was obtained an ethylxylene fraction in amount corresponding to approximately 83 percent of theory based on the ethyl fluoride taken.

Example 4.—Ethylation of mesitylene

By procedural steps similar to those described in Example 3, under substantially the same conditions, and using 0.5 mole of mesitylene in place of the one mole of m-xylene, there was obtained ethylmesitylene in amount corresponding to approximately 79 percent of theory based on the ethyl fluoride taken.

Example 5.—Propylation of toluene

To 1.5 moles of toluene at the temperature of solid carbon dioxide was added 0.5 mole of isopropyl fluoride, and the resulting mixture was saturated with boron trifluoride, there being used 0.5 mole of the latter. The resulting mixture was allowed to warm slowly to room temperature with copious evolution of boron trifluoride. The resulting organic liquid layer was washed with water until free of acid, dried, and fractionally distilled. After collecting the unreacted toluene, there was obtained a mixture of isopropyltoluenes (cymenes) in amount corresponding to approximately 84 percent of theory based on the isopropyl fluoride taken.

Example 6.—Butylation of toluene

By procedural steps similar to those described in Example 5 and using tert-butyl fluoride in place of isopropyl fluoride and one mole of toluene in place of 1.5 moles of toluene, there was obtained a mixture of tert-butyl toluenes (tert-butylmethylbenzenes) in amount corresponding to approximately 68 percent of theory based on the tert-butyl fluoride taken.

Example 7.—Alkylation with alkyl fluoroborates

In a series of tests, boron trifluoride was passed into separate 0.5-mole portions of methyl fluoride, ethyl fluoride, isopropyl fluoride, and tert-butyl fluoride, respectively, 0.5 mole of boron trifluoride being used in each instance, at temperatures in the range from $-50°$ to $-110°$ C.

To each of the resulting pre-formed alkyl fluoroborates was then added 0.5 mole of toluene at $-80°$ C., with vigorous stirring. The resulting complexes were allowed to warm to room temperature with evolution of boron trifluoride. The resulting organic materials were washed with water until free of acid, dried, and fractionally distilled, whereby there were obtained the corresponding alkylated toluenes, viz, xylene, ethyltoluene, isopropyltoluene, and tert-butyltoluene, in yields corresponding to from 80 to 85 percent of theory based on the starting materials taken.

In manner like those described in the foregoing examples, other aromatic compounds can be alkylated with alkyl fluorides of the kinds hereinbefore described with substantially the same results in preparation of alkyl-substituted aromatic compound products.

That which is claimed is:

1. A method which comprises interacting, in a liquid reaction mixture at temperatures below 50° C., (a) an aromatic compound having only nuclear benzoid unsaturation and selected from the group consisting of hydrocarbons and nuclear halogenated hydrocarbons and that is, per se, substantially inert to boron trifluoride at such temperatures and that contains at least one replaceable hydrogen atom on an aromatic nucleus, (b) an alkyl fluoride, and (c) boron trifluoride in molar proportion approximately equivalent to the amount of the alkyl fluoride, and recovering from the resulting reaction mixture an alkyl-substituted aromatic compound corresponding to the organic starting materials.

2. The method of claim 1 wherein the aromatic compound starting material is a hydrocarbon of the benzene series.

3. The method of claim 1 wherein the boron trifluoride is added to a liquid mixture of the starting aromatic compound and alkyl fluoride.

4. The method of claim 1 wherein the starting aromatic compound is added to a pre-reacted mixture of the starting alkyl fluoride and boron trifluoride.

5. A method which comprises mixing and cooling to a temperature between $-100°$ C. and 0° C. at which the resulting mixture is liquid (a) one mole proportion of a benzene hydrocarbon that is, per se, substantially inert to boron trifluoride at such temperature and that contains at least one replaceable hydrogen atom on the benzene nucleus and (b) from 0.1 to one mole proportion of an alkyl fluoride, adding to the resulting mixture and reacting therewith, while maintaining the temperature thereof between $-100°$ C. and 0° C., (c) boron trifluoride in mole proportion equivalent to the alkyl fluoride in that mixture to make a reaction complex, warming and decomposing that complex with evolution of boron trifluoride, and recovering from the resulting reaction mixture an alkyl-substituted benzene hydrocarbon product.

References Cited in the file of this patent

UNITED STATES PATENTS

| | | |
|---|---|---|
| 2,373,580 | Linn | Apr. 10, 1945 |
| 2,626,966 | Kennedy et al. | Jan. 27, 1953 |
| 2,691,622 | Kennedy et al. | Oct. 12, 1954 |

OTHER REFERENCES

Olah et al.: Nature, vol. 178, No. 4546, Dec. 15, 1956, pp. 1344–45.